United States Patent [19]

Schmitt et al.

[11] Patent Number: 4,851,617

[45] Date of Patent: Jul. 25, 1989

[54] DEVICE FOR MOUNTING THIRD RAIL ENGAGING EQUIPMENT ON RAILWAY TRUCKS

[75] Inventors: Dallas L. Schmitt, Belleville, Ill.; Richard B. Polley, St. Charles, Mo.

[73] Assignee: GSI Engineering, Inc., St. Louis, Mo.

[21] Appl. No.: 130,443

[22] Filed: Dec. 9, 1987

[51] Int. Cl.$^4$ ............................................... B60L 5/38
[52] U.S. Cl. ........................................ 191/49; 191/60.3
[58] Field of Search ............... 191/1 R, 45 R, 49, 60.3, 191/62, 66, 68, 69; 104/279; 105/34.1, 34.2, 49.0

[56] References Cited

U.S. PATENT DOCUMENTS

| | | | |
|---|---|---|---|
| 886,319 | 4/1908 | Farnham | 191/49 |
| 1,199,669 | 9/1916 | Dacey | 191/60.3 |
| 1,872,351 | 8/1932 | Schaake et al. | 191/49 |
| 3,114,441 | 12/1963 | Sprigings | 191/69 |
| 3,740,498 | 6/1973 | Herbert | 191/49 |
| 4,042,081 | 8/1977 | Pier | 191/49 |

Primary Examiner—James B. Marbert
Assistant Examiner—Joseph D. Pape
Attorney, Agent, or Firm—F. Travers Burgess

[57] ABSTRACT

A device for mounting third rail engaging equipment on a railway truck comprises a fixed part mounted on and extending outwardly from a side member of a railway truck and a vertically moveable part pivotally mounted on the fixed part and mounting the third rail engaging equipment support, the moveable part being normally latched to the fixed part for maintaining the third rail engaging equipment such as current collectors and sleet scrapers at optimum operating pressure against the third rail, and arranged for automatic release responsive to receipt by the third rail engaging equipment of a predetermined upward impact from the third rail whereby to protect the third rail engaging equipment and its supports from the truck structure against impacts in excess of the predetermined impact, and for automatic gravity-responsive resetting whereby to cause the third rail engaging equipment to continue functioning at its optimum operating pressure.

12 Claims, 4 Drawing Sheets

DEVICE FOR MOUNTING THIRD RAIL ENGAGING EQUIPMENT ON RAILWAY TRUCKS

BACKGROUND OF THE INVENTION

1. Field of the Invention

The invention relates to third rail collection devices for electric rolling stock and consists particularly in an automatic release, automatic reset impact protection device for supporting third rail engaging equipment from railway trucks and protecting the equipment from excessive vertical impacts and automatically restoring the equipment to operative position.

2. The Prior Art

In the prior art, third rail engaging equipment has commonly been mounted on unsprung parts of the vehicle trucks such as equalizer beams or journal boxes and has included a shoe operable either by gravity, or springs, to bias the shoe into electro-conductive engagement with the electrical conductor rail, usually a third rail positioned outwardly of the running rails and normally supported on crosstie-mounted brackets at a higher level than the running rails. Such equipment sometimes includes sleet scrapers spring-biased into scraping relation with the third rail.

In other instances, the third rail engaging equipment supports have been mounted on a sprung part of the truck. In both instances, the receipt of vertical impacts by the third rail engaging equipment resulting from acceleration forces caused by differential ramping between the running rails and the third rail might cause damage to the third rail engaging equipment and its mounting on the truck, and in the second instance, the receipt of vertical impacts by the third rail engaging equipment resulting from vertical movement of the sprung truck part on its springs might cause damage to the equipment and its mounting on the sprung truck part.

SUMMARY OF THE INVENTION

The principal object of the invention is the provision of a device for supporting the third rail engaging equipment, such as current collector shoes and sleet scrapers, from truck framing arranged to maintain optimum operating pressure on the third rail engaging equipment for current collection and efficient ice removal and to release the pressure on the third rail engaging equipment automatically when an upward impact of predetermined value; e.g. 3 Gs, approaching a potentially damaging value, e.g. in excess of 3 Gs, is received.

A further object is the additional provision of means for automatically resetting and locking the mounting device in its normal operating condition following cessation of the releasing impact.

A further object is to release the mounting device responsive to the receipt by the third rail engaging equipment of upward impact of predetermined value and to reset and lock the mounting device in operating condition by gravity.

DETAILED DESCRIPTION OF THE INVENTION

The Preferred Embodiment

Figure 1:
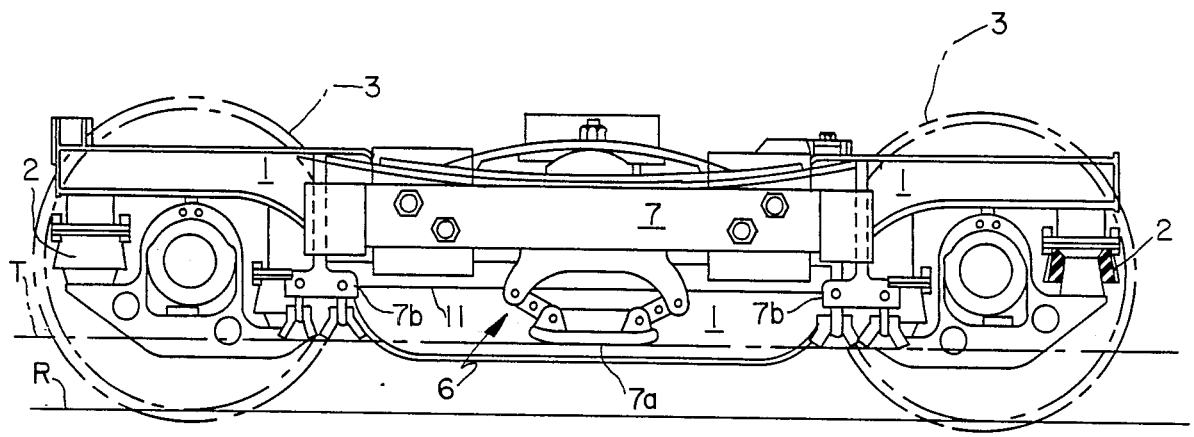
FIG. 1 is a side elevational view of an electric railway truck mounting third rail engaging equipment including a current collector and sleet scrapers.
Figure 2:
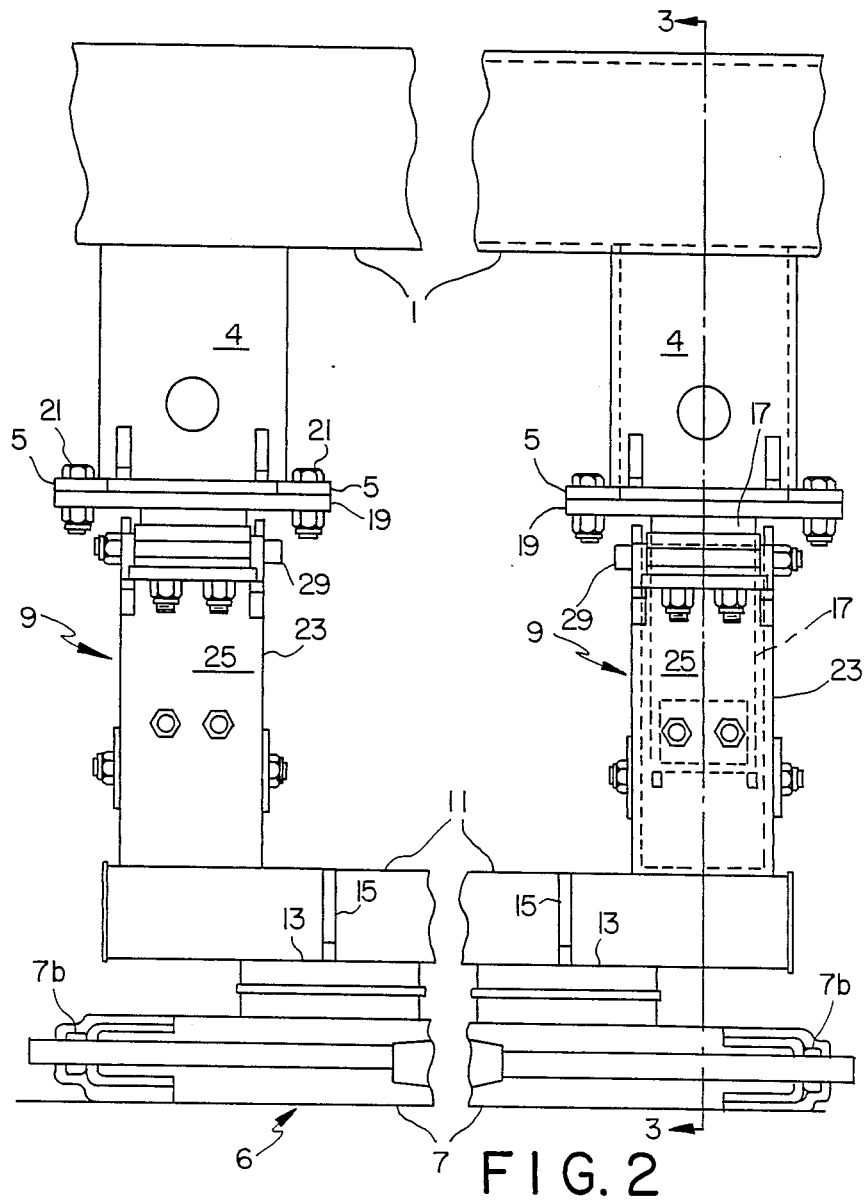
FIG. 2 is an enlarged top view of the third rail engaging equipment mounting incorporating two of the impact protection devices, and adjacent portions of the supporting truck sideframe.
Figure 3:
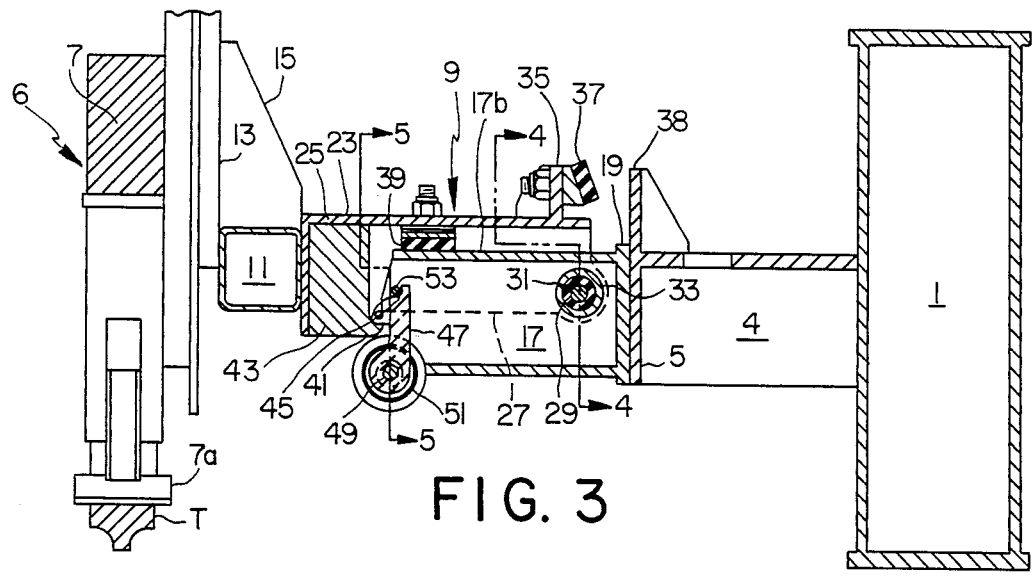
FIG. 3 is a transverse section of the impact protection device taken from line 3—3 of FIG. 2, in latched operating position.
Figure 4:
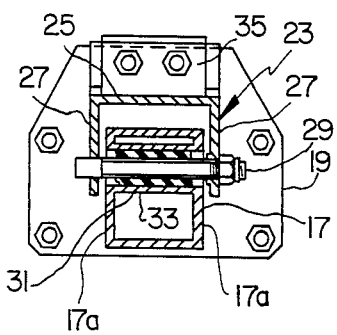
FIGS. 4 and 5 are longitudinal vertical sectional views taken along lines 4—4 and 5—5 respectively of FIG. 3.
Figure 5:
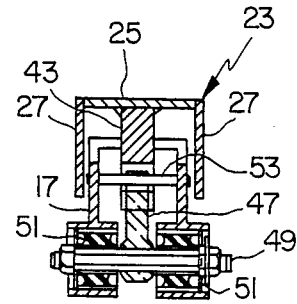

Referring to FIGS. 1 to 3, the numeral 1 denotes the sideframe of a railway truck supported by spring devices 2 from wheels 3 riding on running rails R and having a pair of outwardly extending fixed arms 4 terminating in flange plates 5 having outward longitudinally coplanar vertical surfaces.

For supporting third rail engaging equipment generally indicated at 6, comprising beam 7, a gravity actuated collector shoe 7a and a pair of spring-loaded sleet scrapers 7b from the truck sideframe 1, and preventing damage to the third rail engaging equipment 6, arms 4 and their connection to the truck itself resulting from excessive vertical impacts received by collector shoe 7a and sleet scrapers 7b from third rail T, impact protection devices generally indicated at 9 are supported from truck structure arms 4. A longitudinal member 11 is secured at its end portions to the outboard portions of impact protection devices 9, and the third rail equipment beam 7 is secured to upstanding brackets 13, 15 on longitudinal member 11.

Each impact protection device 9 comprises a box section fixed base member 17 oriented transversely of the truck and having a mounting flange 19 secured by bolts 21 to flanges 5 on sideframe arms 4.

A pivoted arm 23 of channel section, having a horizontal web 25 and depending flanges 27 overlyingly partially receives base member 17 and is pivotally connected at its inner end to the base member 17 by a pin 29 journalled by means of an elastomeric bushing 31 in a tube 33 extending between the sidewalls 17a of box section base member 17.

For limiting upward releasing (clockwise as seen in FIGS. 3 and 6-8) movements of arm 23 about pin 29 an upstanding abutment 35 on web 25 of arm 23 mounts an elastomeric bumper pad 37 engageable with an upward extension 38 of flange plate 5 on truck frame bracket 4. For limiting downward latching movement of arm 23 about pin 29 and fixing the normal latched portion of arm 23, a horizontal elastomeric pad 39 is mounted on the bottom surface of arm web 25 for engagement with the upper surface of the top wall 17b of base member 17.

For locking the pivoted arm 23 in the operating position shown in FIG. 3, a locking device comprising an horizontal upwardly facing laterally inwardly directed lug 41 on an element 43 affixed to the interior surfaces of the outboard end of pivoted arm 23 is positioned to underlyingly engage a horizontal downwardly facing outwardly directed lug 45 on an upstanding latch 47 pivotally mounted via pin 49 and of torsionally stressed elastomeric bushings 51 in the sidewalls of base member 17, whereby latch 47 is biased outwardly (counterclockwise as seen in FIGS. 3 and 6–8) into engagement with stop pin 53. It will be evident from FIG. 3 that when in engagement with stop pin 53, latch 47 is substantially vertical and its lug 45 projects in an outboard (counter clockwise) direction from the vertical center line of pivot pin 49 of latch 47 such that the outboard end of lug 45 overlies the inboard end portion of lug 41, locking pivoted arm 23 in operative position to maintain the third rail collector beam 7, positioned for engagement of the contact shoe 7a and sleetscrapers 7b with third rail T and to maintain the sleetscrapers at optimum presure against the third rail. With lugs 41 and 45 in locking position, it will be evident that the area of engagement between the lug surfaces is located angularly outwardly (in the counterclockwise direction) from the vertical centerline of latch pivot pin 49, so that upward vertical force F applied to lug 45 by lug 41 results in a clockwise moment on latch 47 about its pivot. While this moment is less than the counterclockwise torque applied to latch 45 by elastomeric bushing 51, lugs 41 and 45 remain in locking relation with each other.

Figure 6:
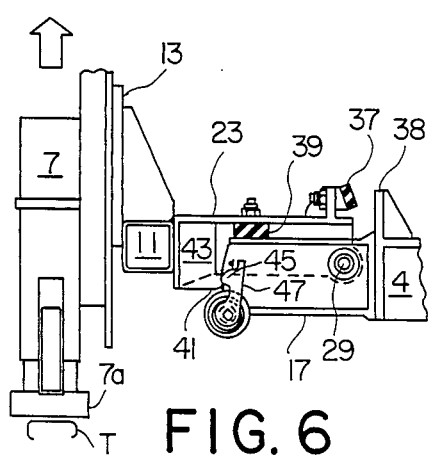
FIGS. 6-8 are views corresponding to FIG. 3 but showing the impact protection device in successive releasing, disengaged and resetting positions, respectively.
Figure 7:
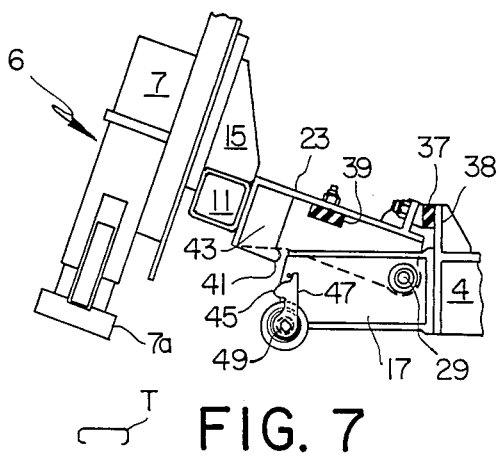
Figure 8:
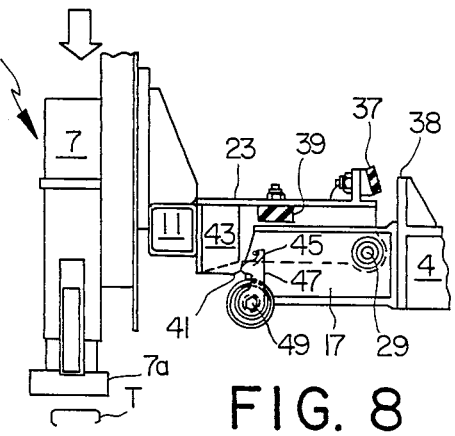
Figure 8A:
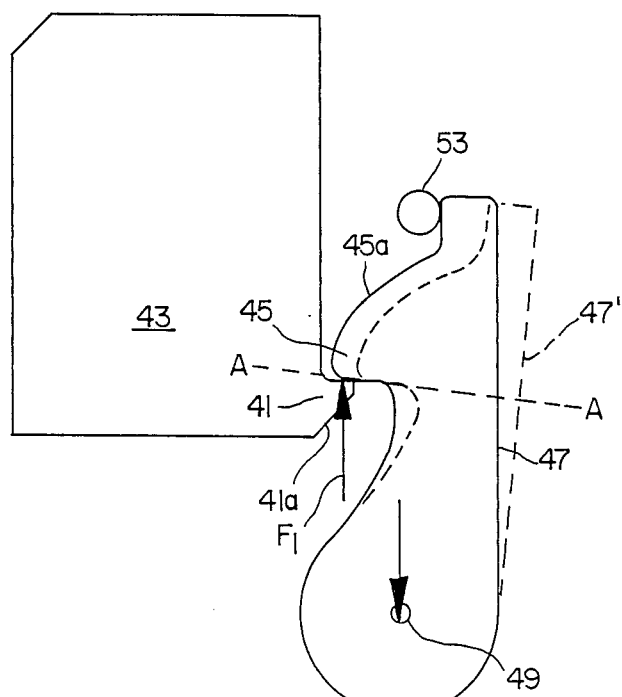
FIG. 8A is an enlarged view of the latch means illustrated in FIG. 3-8.

To provide automatic release of pivoted arm 23 and free upward movement of beam 11 and the third rail engaging equipment 6 when the latter receives a predetermined upward impact, e.g., 3Gs; the clockwise moment applied by force F to latch 47 exceeds the counterclockwise torsional stress of elastomeric bushing 51 which is calibrated to deflect torsionally at this point, causing latch 47 to pivot laterally inboard (clockwise) and its lug 45 to move arcuately in an inboard direction during which the bottom surface of lug 45 is tilted to the sloping position shown at A—A in FIG. 8 and slides on the bottom surface of lug 41 until clear of lug 41 (see FIGS. 6, 7 and 8A). Arm 23 is thus freed 23 for upward (clockwise as seen in FIG. 3) movement about pin 29 thereby thus eliminating potentially damaging impacts on the third rail collector mechanism and its supports from the truck side frame, such upward movement being cushioned and limited by engagement of elastomeric bumper pad 37 on movable arm 23 with abutment flange 38 on sideframe bracket 4. Upon cessation of the upward impact, arm 23 falls back by gravity to the position shown in FIG. 3, its fall being limited and cushioned by engagement of elastomeric pad 39 with the top surface of base member 17, and the pivoted arm 23 and base member 17 are reset and locked in operating position when the sloping bottom of lug 41, sliding on the sloping top of latch lug 45, forces the latch 47 to pivot inboard about pin 49 until lug 41 is lower than latch lug 45, the contact angle formed by the sloping bottom and top surfaces 41a and 45a respectively of lugs 41 and 45 being such that this downward force of 1G applied to the top surface of lug 45 exerts and inboard-directed horizontal component on latch 47 sufficient to overcome the torsional resistance of bushing 51 and thereby force latch 47 to pivot clockwise. The counterclockwise torsional force of bushing 51 biases latch 47 outboardly until it is stopped by pin 53 and its lug 45 overlyingly engages lug 41, thereby locking pivoted arm 23, beam 11 and third rail engaging equipment 6 in operative current collecting and sleet scraping relation with third rail T.

OPERATION OF THE PREFERRED EMBODIMENT

Operation of the device illustrated in FIGS. 2–8 can best be seen in FIGS. 3 and 6–8. As previously mentioned, FIG. 3 shows the protector device locked in operative position with third rail engaging equipment 7, 7a, 7b in current-collecting and sleet-scraping engagement with the third rail T. On receipt of a predetermined impact, e.g. 3 Gs, the upward force on the third rail engaging equipment urges movable arm 23 upwardly about pivot pin 29 and through the engagement of lug 41 with lug 45 on latch 47 overcomes the torsional resistance of elastomeric bushings 51 to cause latch 47 to pivot clockwise (as seen in the drawings) until lug 41 is clear of latch 47 as seen in FIG. 6 and the force of the impact swings pivoted arm 23 to the position shown in FIG. 7, in which further upward movement of pivoted arm 23 and third rail engaging equipment 6 is prevented by engagement of elastomeric pad 37 and abutment flange 38 on truck frame bracket 4. Gravity, aided by torsion in bushing 31, causes pivoted arm 23 and the third rail engaging equipment to move downwardly as seen in FIG. 8 so that the sloping bottom on lug 41 slidably engages the sloping top on latch lug 45, pushing latch 47 clockwise against the torsional resistance of bushings 51 until lug 41 is as low as lug 45. When this occurs, bushings 51 move latch 47 counterclockwise, causing lug 45 to overlyingly engage lug 41 and lock pivoted arm 23 and third rail engaging equipment in the operating position of FIG. 3, with the third rail contact shoe 7a and sleet scrapers 7b in engagement with the third rail T.

THE SECOND EMBODIMENT

Figure 9:
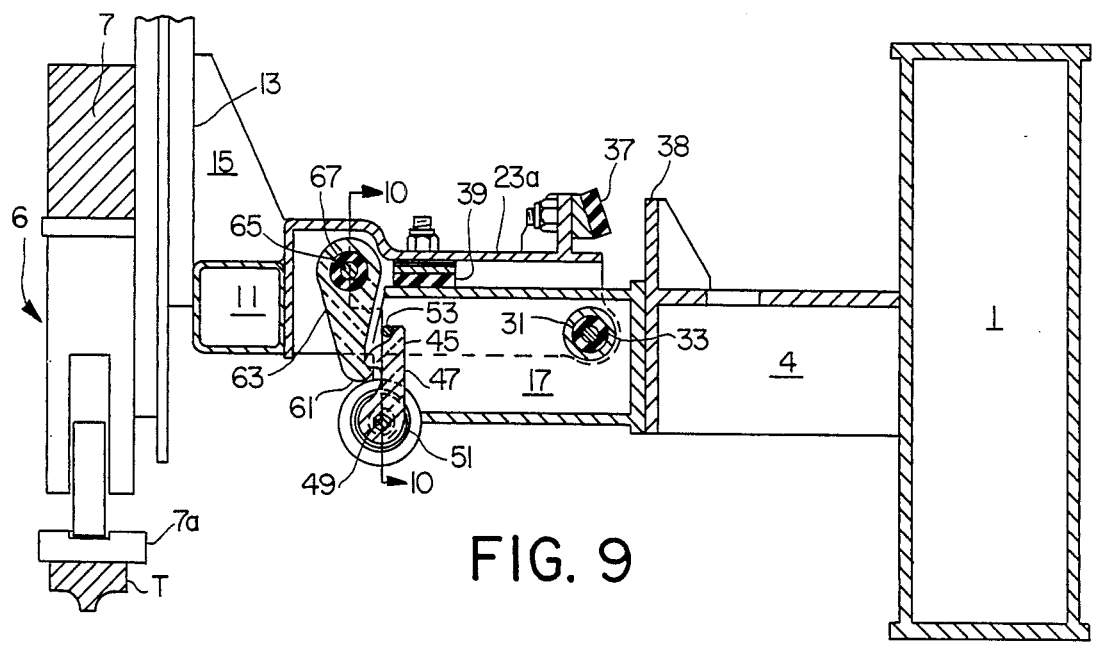
FIG. 9 is a transverse vertical sectional view corresponding to FIG. 3, showing a second embodiment of the invention.
Figure 10:
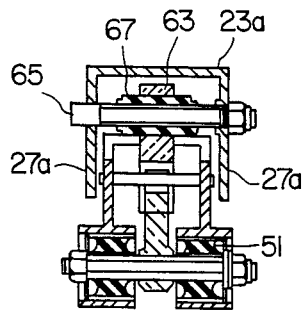
FIG. 10 is a vertical sectional view taken from line 10—10 of FIG. 9.
Figure 11:
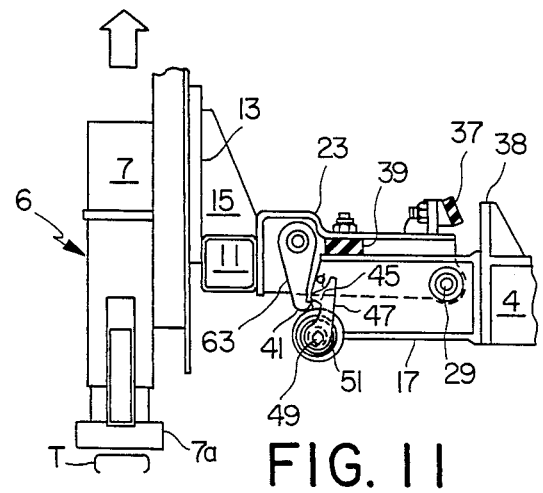
FIGS. 11-13 are views corresponding to FIGS. 6—8, but showing the embodiment of FIG. 9 in releasing, disengaged and resetting positions, respectively.
Figure 12:
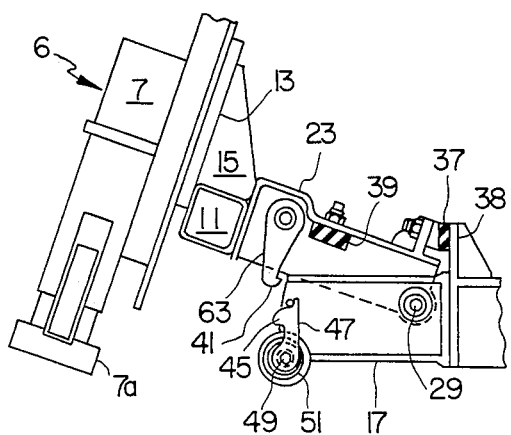
Figure 13:
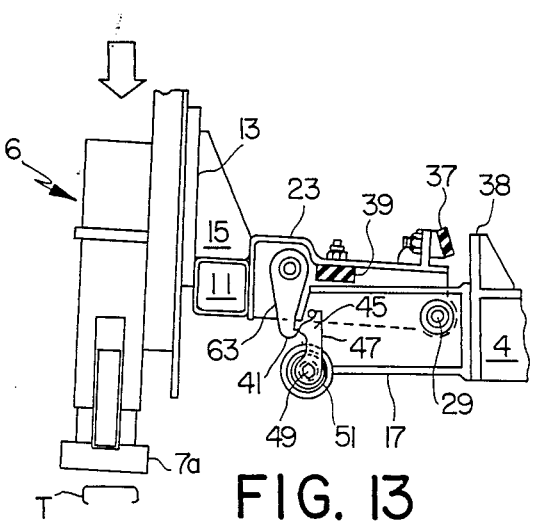

The embodiment of FIGS. 9 and 10 is similar to that of FIGS. 2–8 except that the fixed lug 41 of FIGS. 2–8 is replaced by a lug 61 on a latch 63 depending from pivoted arm 23a and pivotally mounted therein via pin 65 and torsionally stressed elastomeric bushing 67 in flanges 27a of pivoted arm 23a, such that when the predetermined impact is transmitted to arm 23a from third rail engaging equipment 7, 7a, 7b, the upward force on lug 61 of depending latch 63 causes latch 63 to pivot clockwise slightly about pin 65 and latch 47 to pivot clockwise slightly about pin 49 (FIG. 11) until the lugs 61 and 45 become disengaged, freeing pivoted arm 23a to pivot upwardly about pin 29 (FIG. 12) and thus relieving third rail collector mechanism 6 from downward pressure on third rail T with resulting damage from excessive impacts. Upon relief of the impact force, pivoted arm 23a descends by gravity aided by torsional force from bushing 31 and the lower sloping end of depending latch 63 slidably engages the upper sloping end of upstanding latch 47 (FIG. 13) causing both latches to pivot clockwise about their respective pins 65 and 49 until lug 61 (FIG. 11) of depending latch 63 and lug 45 of upstanding latch 47 are substantially aligned and the torsional bushings 67 and 51 rotate the lugs 61 and 45 into opposing locking engagement with the collector shoe 7a and sleet scrapers 7b in normal engagement with the third rail T, as shown in FIG. 9.

THE THIRD EMBODIMENT

Figure 14:
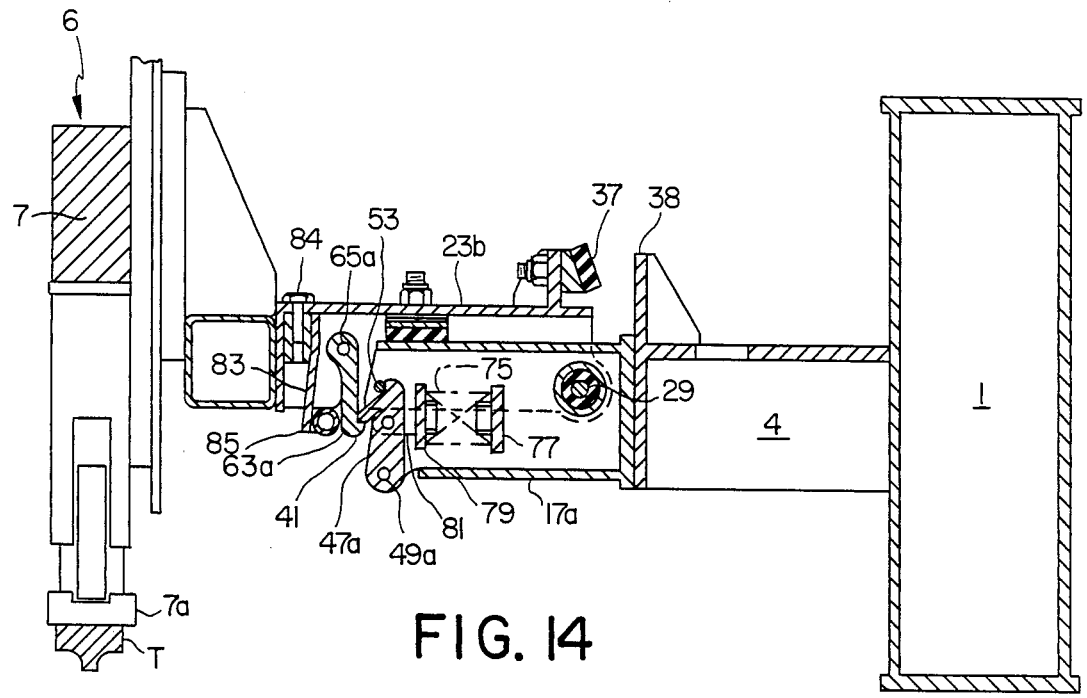
FIG. 14 is a transverse vertical sectional view corresponding to FIGS. 3 and 9, showing a third embodiment of the invention.

The embodiment of the invention shown in FIG. 14 is generally similar to that of FIGS. 9 and 10 except that the upstanding latch 47a and depending latch 63a are mounted directly by simple pivots 49a and 65a to the sidewalls of device base 17a and 23b and a coil spring 75 seated against an abutment 77 fixed to the sidewalls of base member 17a acts through spring cap 79 and push-rod 81 to bias upstanding latch 47 counterclockwise to its locking position engaging stop pin 53, and a flat spring 83 anchored at 84 to the top wall of pivoted arm 23b and depending therefrom to engage a projection 85 mounted on latch 63a so as to bias depending latch 63a into normal locking engagement with latch 47a. Operation of the embodiment is substantially the same as that of the second embodiment except for the resilient positioning of latches 47a and 63a by coil spring 75 and flat spring 83.

The details of the truck structure, the impact protection devices and the third rail engaging equipment disclosed herein may be varied substantially without departing from the spirit of the invention and the exclusive use of all such modifications as come within the scope of the appended claims is contemplated.

We claim:

1. A device for supporting third rail engaging equipment from railway truck structure and normally maintaining such equipment in operating relationship with the third rail, comprising a base member projecting laterally outwardly from the truck structure and fixed thereto, an arm member pivotally mounted on said base member on an axis longitudinal of the truck structure to swing upwardly thereon, means secured to the outboard end of said arm member for fixedly mounting the third rail engaging equipment, cooperating latch means normally in latching relation on said base member and said arm member for locking said arm member against upward movement, said latch means being releasable responsive to receipt of an upward impact of predetermined magnitude by the third rail engaging equipment from the third rail whereby to permit free upward movement of said pivotally mounted arm member, said arm member being automatically returnable by gravity to its normal position, and said latch means being automatically returned to latching relationship responsive to gravitational return of said arm member to its normal position, said latch means comprising a first lug on one of said members and a pivoted latch on said other member, said latch having a pivot axis and a second lug spaced form the pivot axis, said lugs having opposing horizontal faces, first resilient means biasing said latch to a substantially vertical position thereby establishing a latch vertical axis and yieldably resisting pivotal movements away from said vertical position, the horizontal face of said second lug extending from the vertical axis of said latch in the same direction as the bias of said resilient means, said lugs being positioned for opposed engagement in spaced relation from a vertical center line of said latch pivot axis whereby upward forces applied by one of said lugs to the other lug provide a moment tending to pivot the latch and its lug away from the latched position of said lugs in opposition to the moment applied to said latch by said resilient means, said resilient means being calibrated to yield and permit such rotation of the latch when a vertical force of predetermined magnitude is received from said third rail equipment by said arm member such that the moment applied to said latch by such vertical force exceeds the opposing moment applied by said resilient means.

2. A device according to claim 1 wherein said lugs have sloping surfaces facing in opposite vertical directions form the horizontal faces of the respective lugs, said sloping surfaces defining a contact angle such that during the gravitational return of said arm member from its inlatched position, a 1G vertical downward force produces a horizontal force component which exceeds the force of said resilient means on said second lug and thereby moves said second lug clear of said first lug, allowing the opposed horizontal faces of said lugs to re-engage.

3. A device according to claim 1 wherein said first lug is rigidly mounted on said arm member.

4. A device acording to claim 1 wherein said arm member pivotally mounts a depending latch, said first lug being on said depending latch and second resilient means biasing said depending latch and said first lug toward said upstanding latch and said second lug.

5. A device according to claim 1 wherein said first resilient means comprises a torsion spring on the pivot axis of said pivoted latch.

6. A device according to claim 5 wherein said torsion spring comprises an elastomeric bushing.

7. A device according to claim 1 wherein said first resilient means comprises a compression spring seated on said base member and operatively connected to said pivoted latch, said spring being expandable generally tangential to the pivotal mounting of said pivoted latch.

8. A device according to claim 4 wherein said second resilient means comprises a torsion spring on the pivotal mounting of said depending latch.

9. A device according to claim 4 wherein said second resilient means comprises a flat spring fixed to said arm member and having a portion acting against the back of said depending latch.

10. A device according to any on of claims 1, 2 and 3-9 wherein said pivoted arm member is of downwardly open channel section partially enveloping said base member.

11. A device according to any one of claims 1, 2 and 3-9 wherein the pivotal mounting of said arm member to said base member includes a torsionally stressed elastomeric bushing.

12. A device according to any one of claims 1, 2 and 3-9 including elastomeric pad means positioned between said arm member and said base member for limiting and cushioning downward movement of said arm member.

* * * * *